United States Patent [19]
Whetsel et al.

[11] Patent Number: 5,456,348
[45] Date of Patent: Oct. 10, 1995

[54] POWERED FLEXIBLE CONVEYOR

[75] Inventors: Larry E. Whetsel, Stow; Leon A. Downing, Peninsula, both of Ohio

[73] Assignee: Axia Incorporated, Oak Brook, Ill.

[21] Appl. No.: 188,362

[22] Filed: Jan. 27, 1994

Related U.S. Application Data

[63] Continuation-in-part of Ser. No. 14,124, Feb. 5, 1993, abandoned.

[51] Int. Cl.$^6$ .................................................. B65G 21/14
[52] U.S. Cl. ............................................. 198/812; 198/782
[58] Field of Search .................................. 198/586, 587, 198/588, 782, 861.2, 787, 788, 791, 594, 861.1, 812; 193/35 TE; 414/529, 532, 537

[56] References Cited

U.S. PATENT DOCUMENTS

| | | | |
|---|---|---|---|
| 2,576,217 | 11/1951 | Eggleston | 198/812 X |
| 2,678,125 | 5/1954 | Bonney, Jr. | 198/812 |
| 3,291,283 | 12/1966 | Keith | 198/782 |
| 3,584,731 | 6/1971 | Dahlem | 198/861.2 X |
| 4,260,053 | 4/1981 | Onodesa | 198/812 |
| 5,086,910 | 2/1992 | Terpstra | 198/782 X |
| 5,107,982 | 4/1992 | Walter | 198/787 X |
| 5,224,584 | 7/1993 | Best et al. | 193/35 TE |

FOREIGN PATENT DOCUMENTS

| | | | |
|---|---|---|---|
| 0004107 | 1/1987 | Japan | 193/35 TE |
| 0477905 | 11/1975 | U.S.S.R. | 198/778 |
| 2204294 | 11/1988 | United Kingdom | 198/782 |

OTHER PUBLICATIONS

1988 "PortaFlex" Brochure, 2 pages.
"Best Expandable Conveyors" Brochure, Best Diversified Products, Inc., 1 page.
"Powerflexi" system Brochure from Flexiveyor Systems, 4 pages.
"Nestaflex" Brochure, 2 pages.
"Power/Flex" Brochure, 1 page.
"Bestflex" Brochure, 4 pages.
"Power Moller" Brochure from Somfy.

*Primary Examiner*—James R. Bidwell
*Attorney, Agent, or Firm*—Laff, Whitesel, Conte & Saret, Ltd.

[57] ABSTRACT

A powdered, flexible, expandable conveyor comprises a pair of flexible, expandable link assemblies, preferably in the form of a plurality of links pivotally connected to each other in an X-shaped chain. The conveyor surface preferably includes a plurality of individually powered rollers. The individually powered rollers are mounted between the link assemblies at spaced locations along the length of the conveyor. Each of the powered rollers is rotatably driven by a motor housed inside the roller together with an individual gear box. Each motor is electrically connected to a terminal block located outside the powered roller which in turn is connected to a power supply. The gear boxes individually associated with the various motors may have different gear ratios in order to accommodate different loading. The conveyor is sufficiently flexible to be able to form a curved conveyor surface.

10 Claims, 10 Drawing Sheets

POWERED FLEXIBLE CONVEYOR

This is a continuation-in-part application to U.S. patent application Ser. No. 08/014,124 filed Feb. 5, 1993, now abandoned.

The present invention relates to conveyors for handling and transporting products and other materials and, more particularly, to flexible and expandable conveyors having powered rollers.

BACKGROUND

Conveyors used for transporting objects, such as boxes, are heretofore known. Such conveyors generally comprise a plurality of rods having freely turning rollers or skate wheels, which define a path or surface for movement of the objects, and a support structure, which enables the length and curvature of the conveyor to be selectively varied. The conveyors can be used to transport objects horizontally and up and down inclines. Some conveyors are supported by a plurality of legs having wheels or casters to provide portability.

Attempts have been made to power the conveyors in order to provide a more effective transporting system. Some conveyors having fixed lengths and linear paths employ individually powered rollers, but these conveyors have limited utility because the distance and path needed to transport materials frequently varies from job to job. Powered conveyors having flexible lengths and paths are more useful, but flexible powered conveyors have not been entirely successful. For example, some flexible powered conveyors use rollers rotatably driven by O-ring or chain drive systems which connect multiple rollers together to multiple external power sources, typically motors mounted on legs of the conveyor. The primary disadvantage of these drive systems is that, when one of the driven rollers is experiencing a heavy load that reduces its rotational speed, power losses are transmitted to all of the other powered rollers connected to the same O-ring or chain. Typically, a roller located on an incline may experience a loss of rotational speed as it transports a heavy box, which likely will cause reductions in the rotational speeds of the other rollers. This slows movement of the other boxes along the conveyor and may cause an undesirable accumulation of boxes at the slow spot on the conveyor.

Yet another problem with the O-ring and chain systems is that the O-rings and chains tend to be long and difficult to keep from tangling without extra hardware, particularly when curved, expanded, or contracted. Another shortcoming of the chain drive systems is that they usually are very difficult and expensive to maintain.

SUMMARY

Accordingly, an object of this invention is to provide a flexible, expandable conveyor having individually-powered rollers so that the power losses are not transmitted to or distributed among the rollers.

A further object is to provide a powered conveyor which can easily flex into horseshoe or other sharp curves, expand, and contract without complication from the drive mechanism or electrical system.

In accordance with these and other objects, a flexible, expandable conveyor in accordance with the preferred embodiment of the invention comprises two or more spaced flexible, expandable link assemblies joined together by at least one powered roller. The powered roller, is rotatably mounted between the link assemblies at spaced locations along the length of the conveyor. Steel, plastic or nylon skate wheels may be combined with the rollers.

At least one of the powered rollers is rotatably driven by a motor and gear box which is housed inside the roller. In one embodiment, each powered roller is connected electrically, but not mechanically, to each other powered roller. In another embodiment, one powered roller is connected by O-rings to one or more driven rollers, so that the powered roller drives the driven rollers.

BRIEF DESCRIPTION OF THE DRAWINGS

The present invention and advantages thereof will become more apparent upon consideration of the following detailed description when taken in conjunction with the accompanying drawings.

DETAILED DESCRIPTION OF THE PREFERRED EMBODIMENTS

Figure 1:
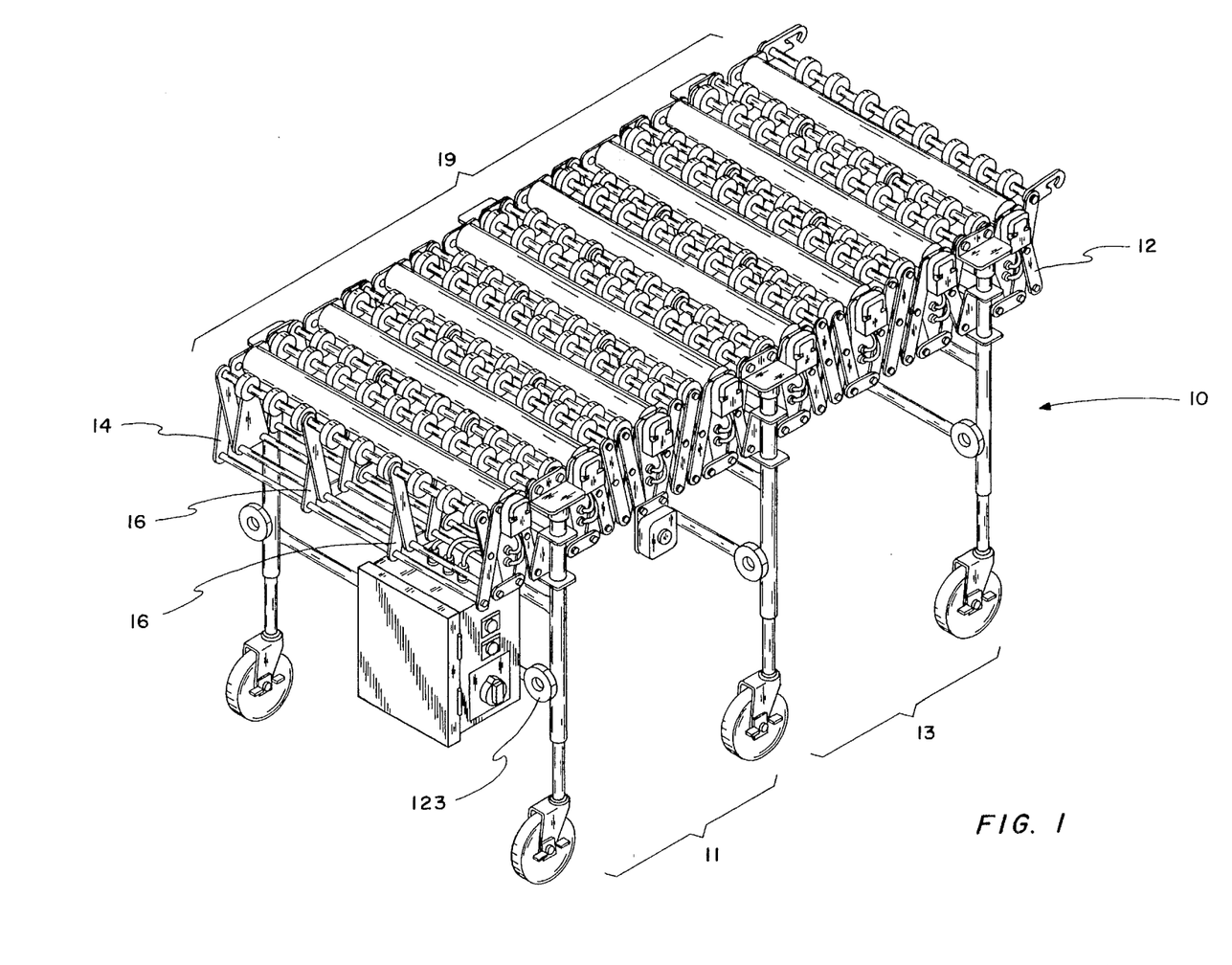
FIG. 1 is a perspective view of the invention in a contracted and linear configuration.
Figure 2:
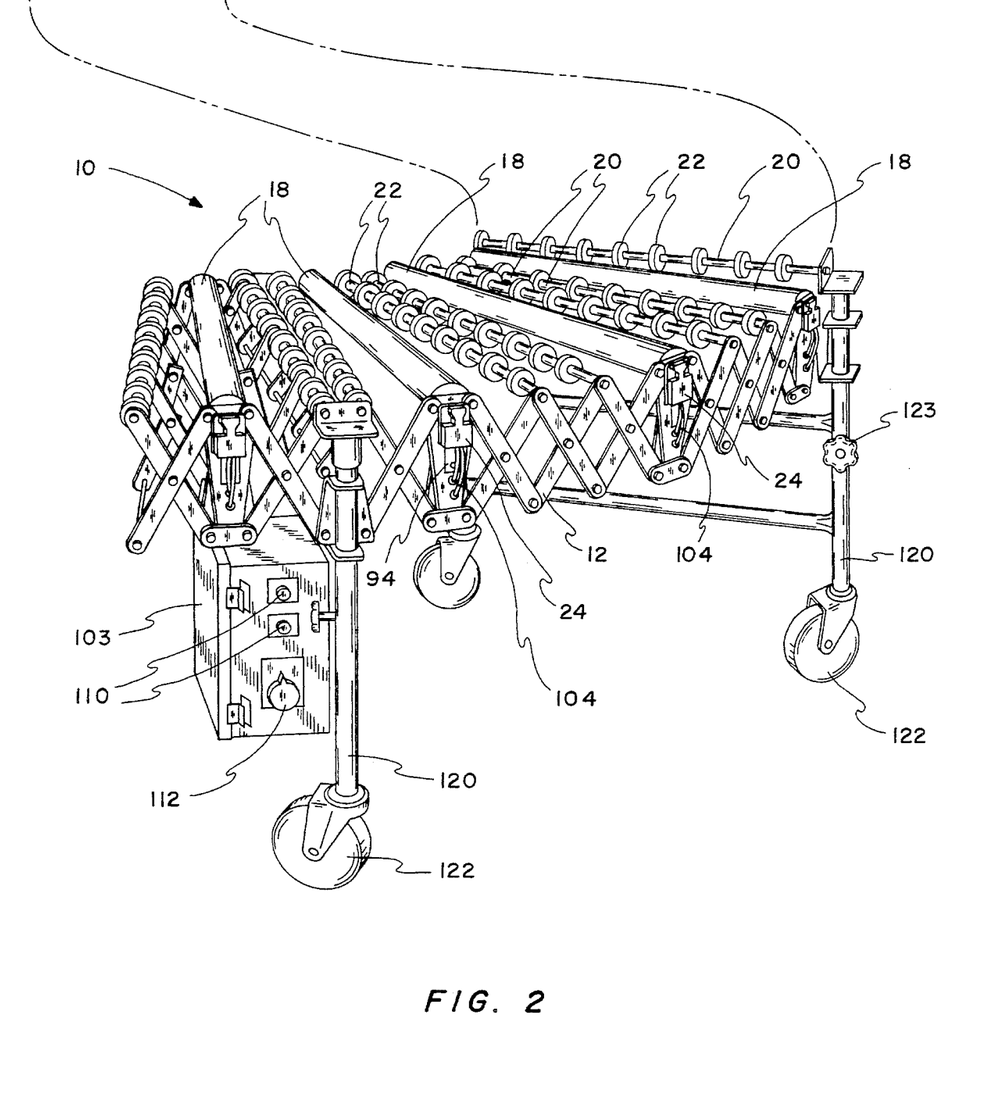
FIG. 2 is a perspective view of one bed section of the invention in an expanded and curved configuration.

FIGS. 1, 2 show a portion of a powered conveyor 10 in accordance with the preferred embodiment of the invention. Generally, the conveyor 10 includes one or more connected bed sections 11, 13, which in turn are each formed from a plurality of link assemblies, leg assemblies, rollers, and skate wheels.

Figure 3:
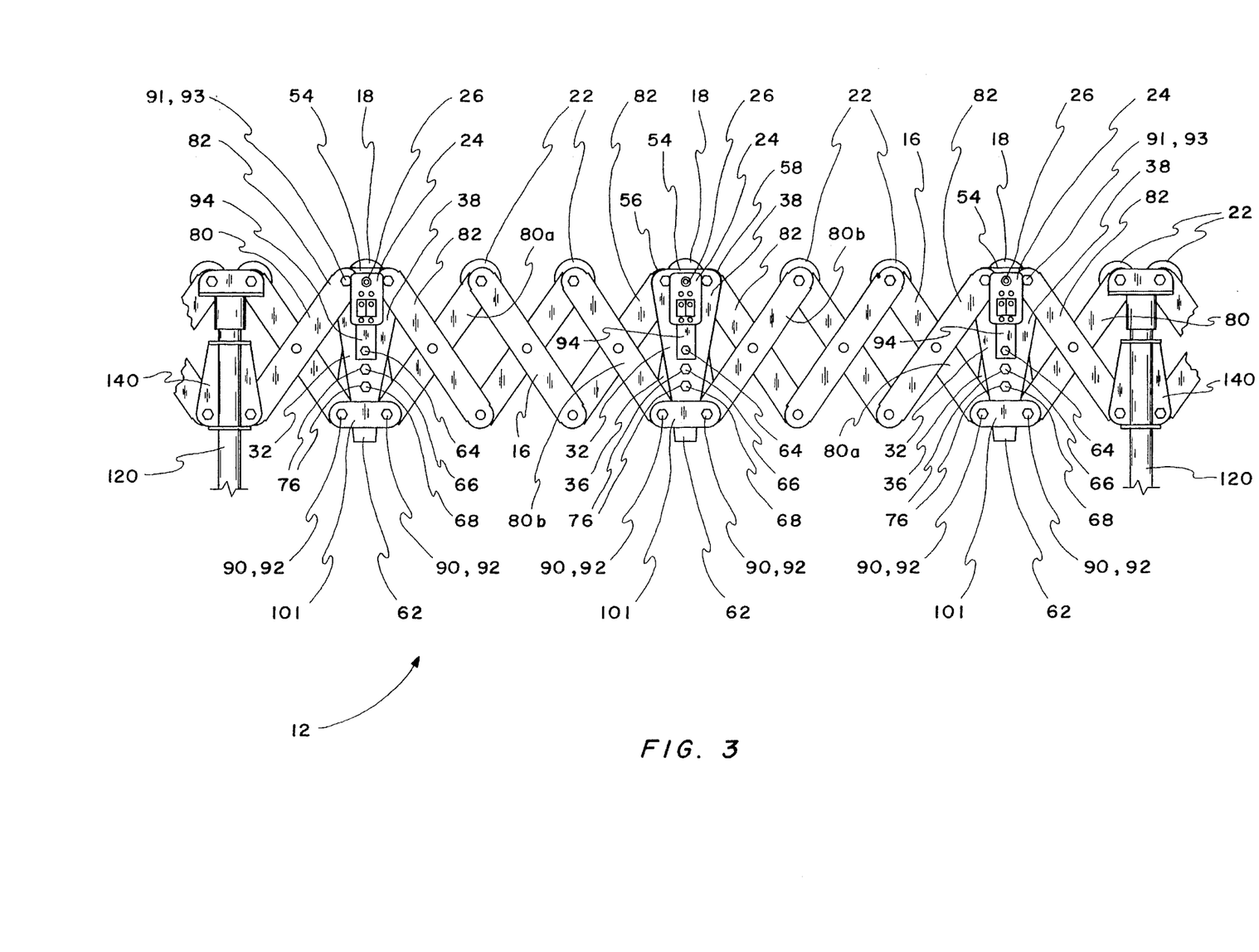
FIG. 3 is a side view showing a part of a side link assembly of the invention, in an extended position.
Figure 4:
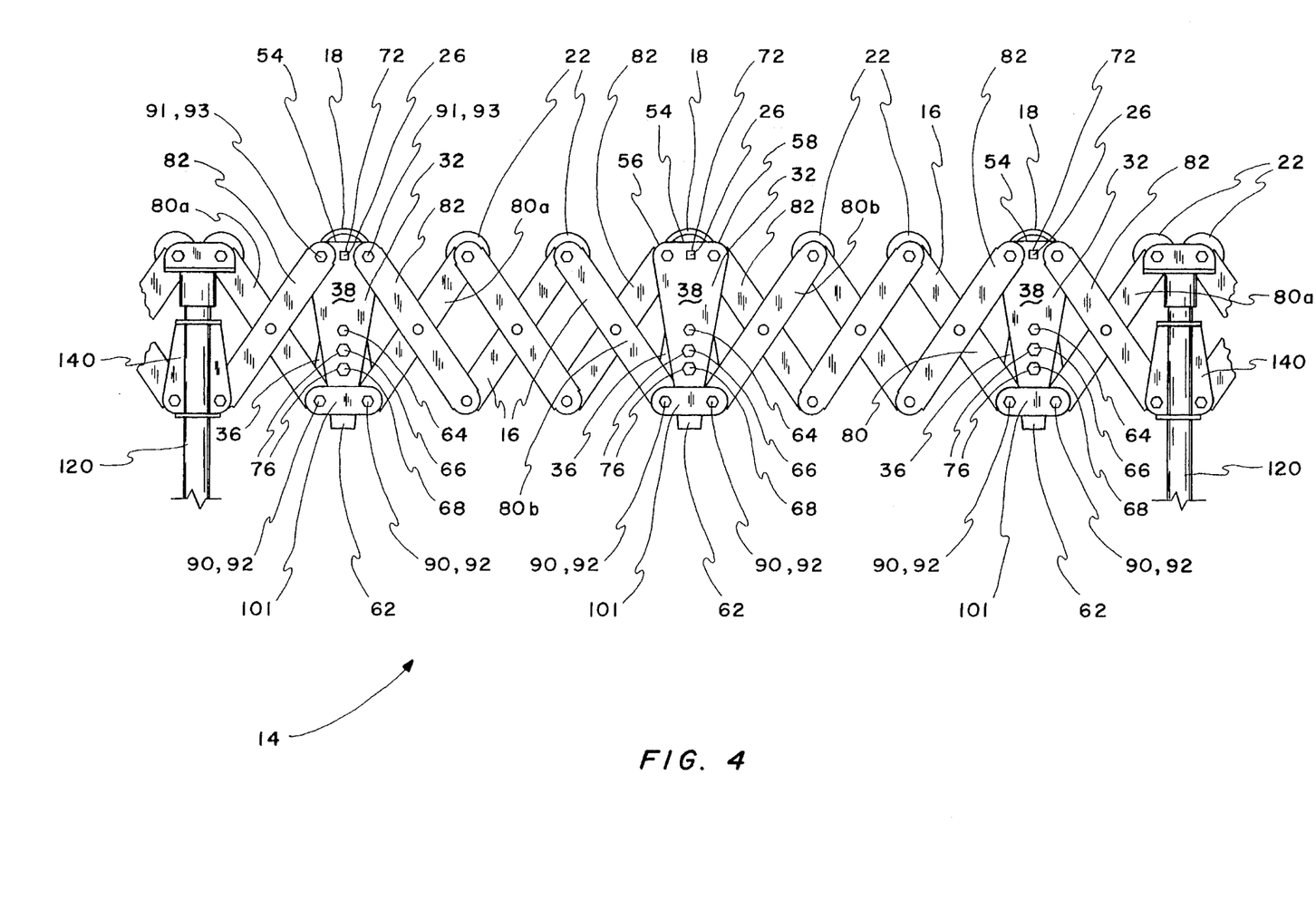
FIG. 4 is a side view showing a part of the opposite side link assembly of the invention, in an extended position.

The link assemblies, best shown in FIGS. 3, 4, include two parallel, spaced side link assemblies 12, 14 extending along the right and left sides of the conveyor. One or more inner link assemblies 16 (FIG. 8) may also be included, each inner link assembly extending between and parallel to the side link assemblies 12, 14. The link assemblies include a plurality of full links 80 and, in the case of an inner link assembly, half links 81 pivotally connected to each other in a series of "X" shaped chains extending substantially the length of the conveyor. A typical conveyor has eight X-shaped full links per bed. When the link assemblies are extended linearly, as in FIGS. 3 and 4, one half of the links, such as 80a, are in generally the same plane, while the other half of the links 80b (those that lie across links 80a), are in a spaced parallel plane. In this manner, the links smoothly and closely compress when the conveyor is contracted.

The side link assemblies 12, 14 further include a plurality of inner power roller links 36 and outer power roller links 38 (FIGS. 5–7), spaced at multiple locations along the length of the conveyor where powered rollers are also to be located. The inner power roller link 36 is a truncated triangular element having a base 40, an apex 42, four rounded corners 44–47, and an elongated slot 50 formed in face of the inner link 36. A pair of apertures 52, 52 are formed in the base corners 44, 45.

The outer power roller link 38 (FIG. 6) is also generally triangular but inverted, having a base 54 with two rounded corners, 56, 58, an apex 60, and a tongue 62 that extends downwardly from the apex 60. A plurality of holes 64, 66, 68 are formed in the face of the outer link 38, and a plurality of apertures 70, 72, 74 are formed along the base 54 of the outer link 38. The lengths of the bases 40 and 54 of the inner and outer power roller links 36, 38 preferably are approximately equal.

Figure 5:
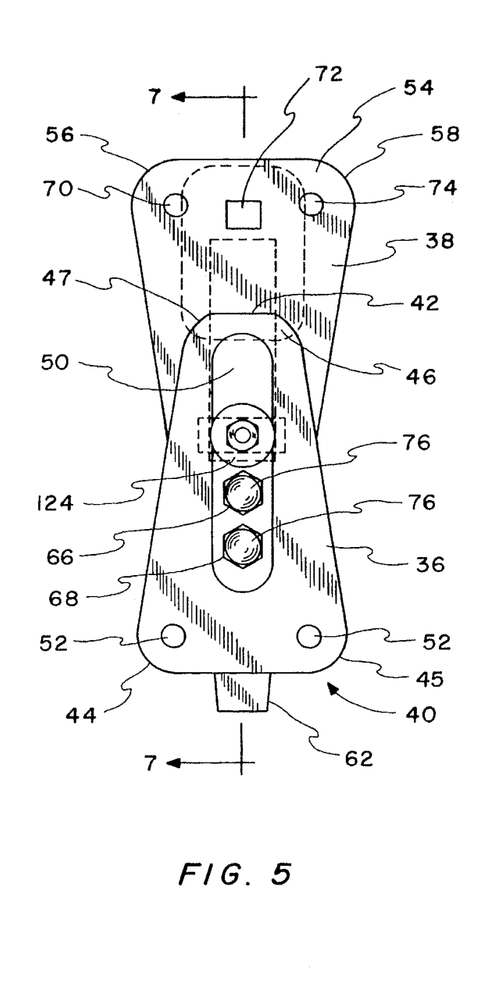
FIG. 5 is a vertical elevation of the rear side of a power roller link assembly of the invention with the terminal block shown in phantom lines.
Figure 6:
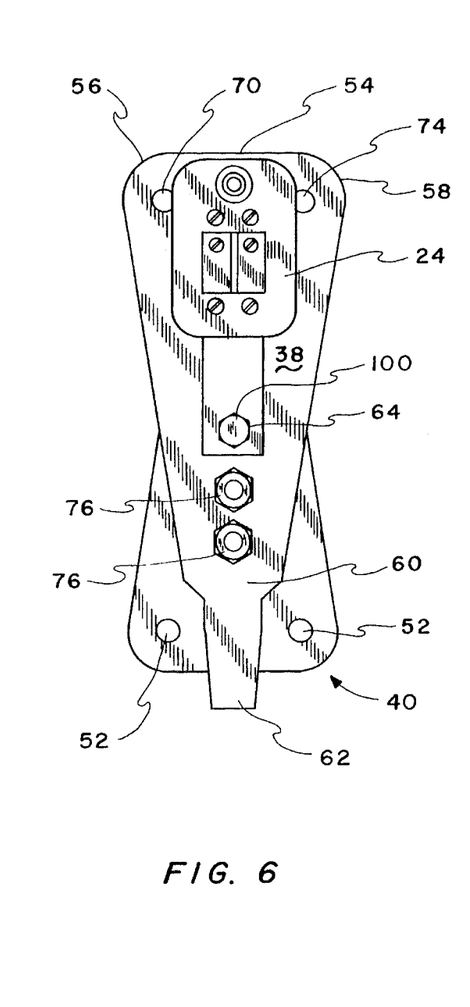
FIG. 6 is a vertical elevation of the front side of a power roller link assembly of the invention, with a terminal block secured thereto.
Figure 7:
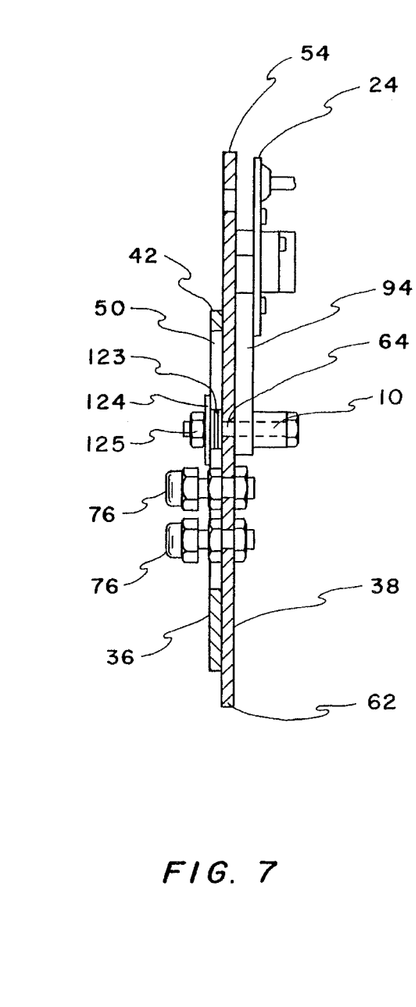
FIG. 7 is a cross section of a power roller link assembly of the invention taken along the lines 7—7 of FIG. 5.

As shown best in FIGS. 5–7, one inner and one outer power roller link 36, 38 are fastened together so that their apexes 42, 60 extend in opposite directions. A pair of fittings 76 for electrical wires extend through the elongated slot 50 formed in the inner power roller link 36 and holes 66, 68 formed in the outer power roller link 38. The inner power roller links 36 and outer power roller links 38 are fastened to the ends of full links 80 by pivot bolts 90 or the like that extend through apertures 92 formed in the full links 80, apertures 70 of the outer power roller link 38, apertures 52 of the inner power roller link 36, and apertures in a side link support plate 101 that joins two full links 80 across tongue 62. The tongue 62 is entrapped between the inner power roller link 36, two full links 80, and a side link support plate 101 allowing the conveyor to extend and contract while maintaining the conveyor surface 19 horizontal.

In the preferred embodiment, the relative vertical positions of the inner and outer power roller links can be adjusted. Three washers 123 or similar spacers are trapped between the outer power roller link 38 and a washer 124 by a bolt 100 and a nut 125 connecting the inner and outer power roller links (see FIGS. 5–7). The three washers 123 have a total thickness which is slightly greater than the thickness of the inner link 36, and they have diameters which are less than the width of slot 50. Washer 124 preferably has a diameter greater than the width of slot 50. With this construction, the outer power roller links 38 remain fixed at a selected vertical position with said rollers and the bases 54 of the outer power roller links 38 remain co-planar with the rest of conveyor bed 19. Inner power roller links 36 adjust or slide vertically along slot 50, depending on the degree of extension of the link assemblies and conveyor. The lateral position of inner and outer power roller links is arranged so that the inner power roller links are generally co-planar with one half of the links 80a, and outer power roller links are generally co-planar with the other half of the links 80b. Again, this permits smooth and close compression of the link assemblies when the conveyor is contracted.

Figures 8, 10, 10A:
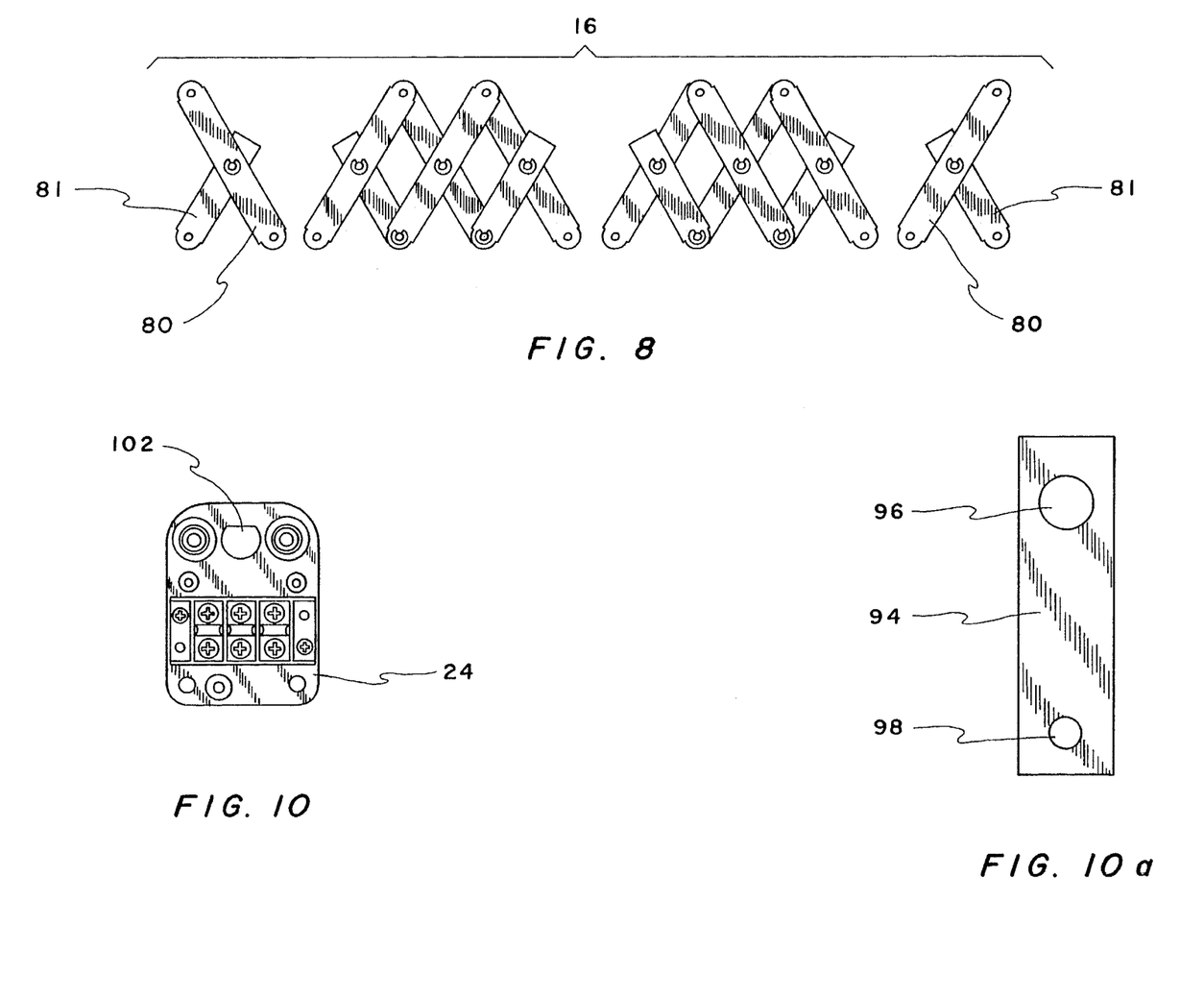
FIG. 8 is a vertical elevation of an inner link assembly of the invention.
FIG. 10 is an elevation view of the terminal block of the invention.
FIG. 10a is an elevation view of the support bracket for a terminal block of the invention.

Terminal blocks 24 for supplying power to the rollers are also mounted on the link assemblies. A terminal block 24 is mounted to each outer power roller link 38 with a support bracket 94 (FIGS. 10 and 10a). In accordance with this construction, the support bracket 94 is generally rectangular and includes apertures 96, 98 near each end. One end of the support bracket 94 is secured to the back of the terminal block 24 by, for example, a weld received within the aperture 96. The other end of the support bracket 94 is secured to outer power link 38 by a bolt 100 or the like that extends through the aperture 98, the hole 64 formed in the outer power roller link 38, and the elongated slot 50 formed in the inner power roller link 36 (see FIGS. 5–7).

Figure 9:
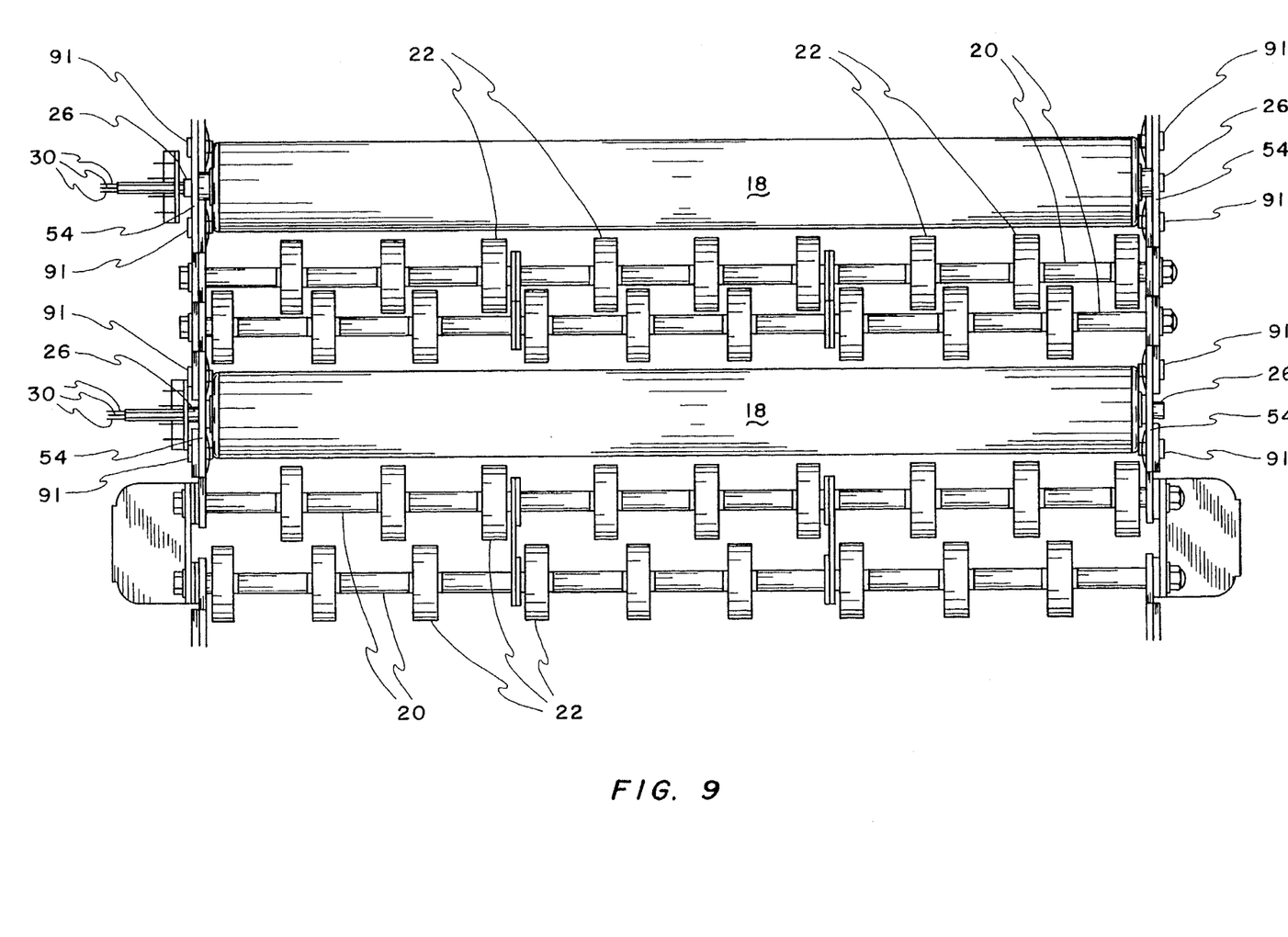
FIG. 9 is a top plan view, schematic in nature, of part of the conveyor bed of the invention.

As shown in FIGS. 1, 2 and 9, the conveying surface 19 of conveyor 10 is formed by a plurality of rollers 18 and a plurality of freely-rotating skate wheels 22 mounted on rods 20 extending between the link assemblies. The rollers 18 and rods 20 are mounted to the link assemblies at spaced locations along the length of the conveyor, so that the rollers and rods extend transversely to the length of conveying surface 19.

Figure 11:
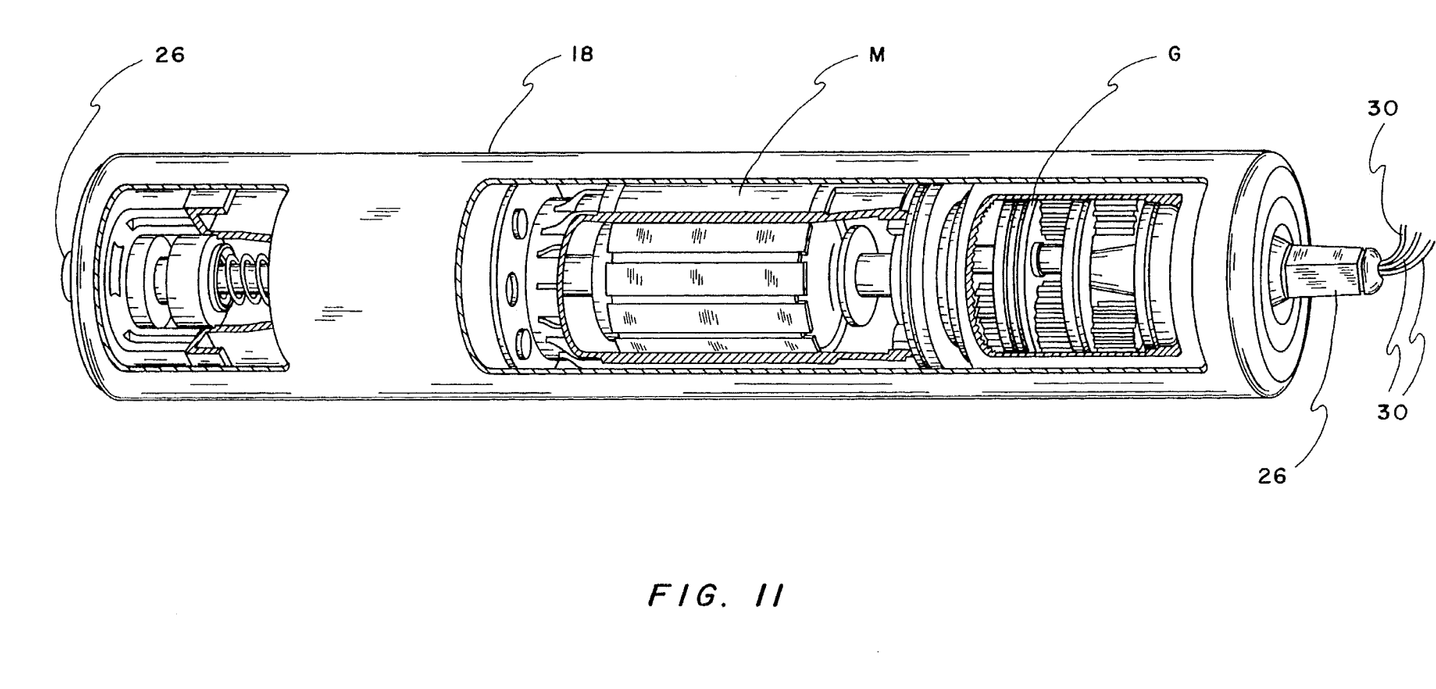
FIG. 11 is a perspective view of a powered roller cut away to show a motor and a gear box.

In the first embodiment of the invention, each roller has its own internally mounted, single phase motor M and an individually associated gear box G as shown in FIG. 11. Each individual motor M is electrically connected by wires 30 to a corresponding terminal block 24 located on each outer power roller link 38. Depending on the use or application for which the conveyor is to be used, one or more of these powered rollers 18 may have different gear boxes G to accommodate higher load areas such as, for example, inclined areas. Shafts 26 extend from the ends of the powered rollers 18 for rotatably mounting the rollers on the side link assemblies 12, 14. In particular, shafts 26 of the powered roller 18 are mounted in the aperture 72 of the base 54 (FIGS. 2, 3, and 4) of the outer power roller links 38. A slot 102 (FIG. 10) is also formed in the terminal block 24 to receive the shaft 26 on one side of the power roller 18. Accordingly, the combination of one inner 36 and one outer 38 power roller link is used to mount each end of a powered roller 18 to the link assemblies 12, 14. A typical bed section includes three powered rollers.

One example of a powered roller 18 (FIG. 11) that may be utilized with the invention is the "Power Moller" roller, which is commercially available from Itah Electric Co., Ltd. 114602, Asazuma-Cho, Kasai City, Hyogo Pref. 679-01 Japan. With this product, three lead wires 30 (FIG. 8) extend from the inside of the powered roller 18 to the corresponding terminals of the terminal block 24 (FIG. 3).

The terminal blocks 24 are connected to a central power supply box 103 (FIG. 2) by a plurality of cables 104, which preferably pass through bores formed in fittings 76 (FIG. 1). Preferably, the cables 104 should have three leads, which should be connected to the corresponding powered roller terminals on terminal block 24. The cables extend from terminal block to terminal block, so that the only power connection between the powered rollers is electrical and not mechanical. Preferably, the terminals are covered by a removable cover so that the electrical connections are concealed.

In the preferred embodiment, the power supply box 103 contains on/off switch 110, forward/reverse switch 112, and a ground fault circuit breaker. If desired, additional on/off or forward/reverse switches may be provided at the ends of the conveyor or at locations spaced along the conveyor.

As shown in FIGS. 1 and 2, the conveyor also includes a plurality of legs which support the conveyor on a floor or other surface. In greater detail, according to the preferred embodiment, the conveyor 10 is supported by a plurality of H-frame legs 120, which may be connected to the link assemblies at spaced locations along the conveyor. The legs 120 may be attached to casters 122, wheels, or the like. The legs 120 preferably are also vertically extendible and adjustable by means of knobs 123. The conveyor 10 may be constructed in any width or length, and can be designed to transfer an object of virtually any weight.

Because each powered roller 18 has its own independent motor M (FIG. 11), the load encountered by one roller has no effect on the rotational speed of the other rollers. This prevents the transmission of power losses between the powered rollers. Additionally, the conveyor 10 does not include the pinch points present in connection with the conventional O-ring and chain drive conveyor systems, or require the high maintenance associated with the chain drive conveyor systems.

Figure 12:
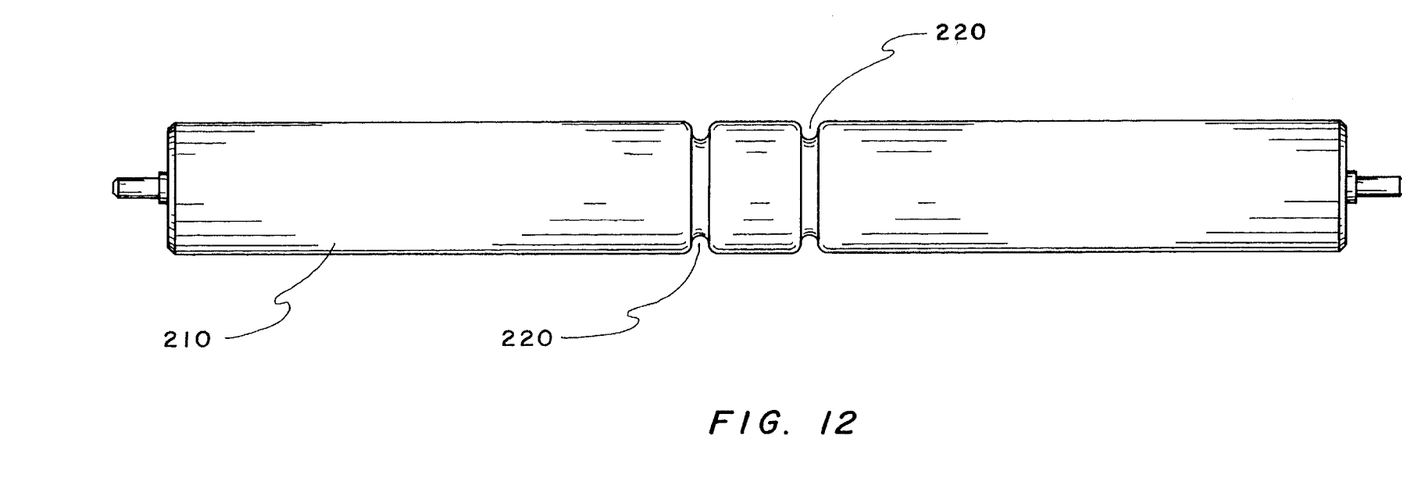
FIG. 12 is a plan view of a grooved driven roller used in a second embodiment of the invention.
Figure 13:
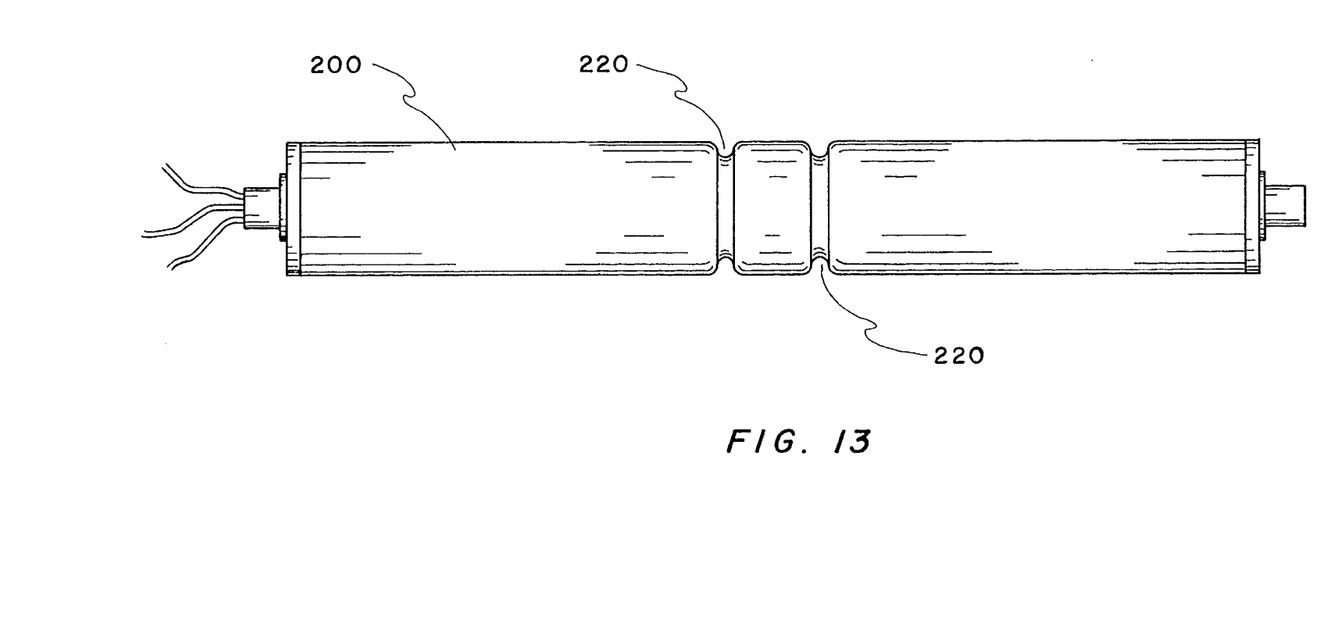
FIG. 13 is a plan view of a grooved powered roller used in a second embodiment of the invention.
Figure 14:
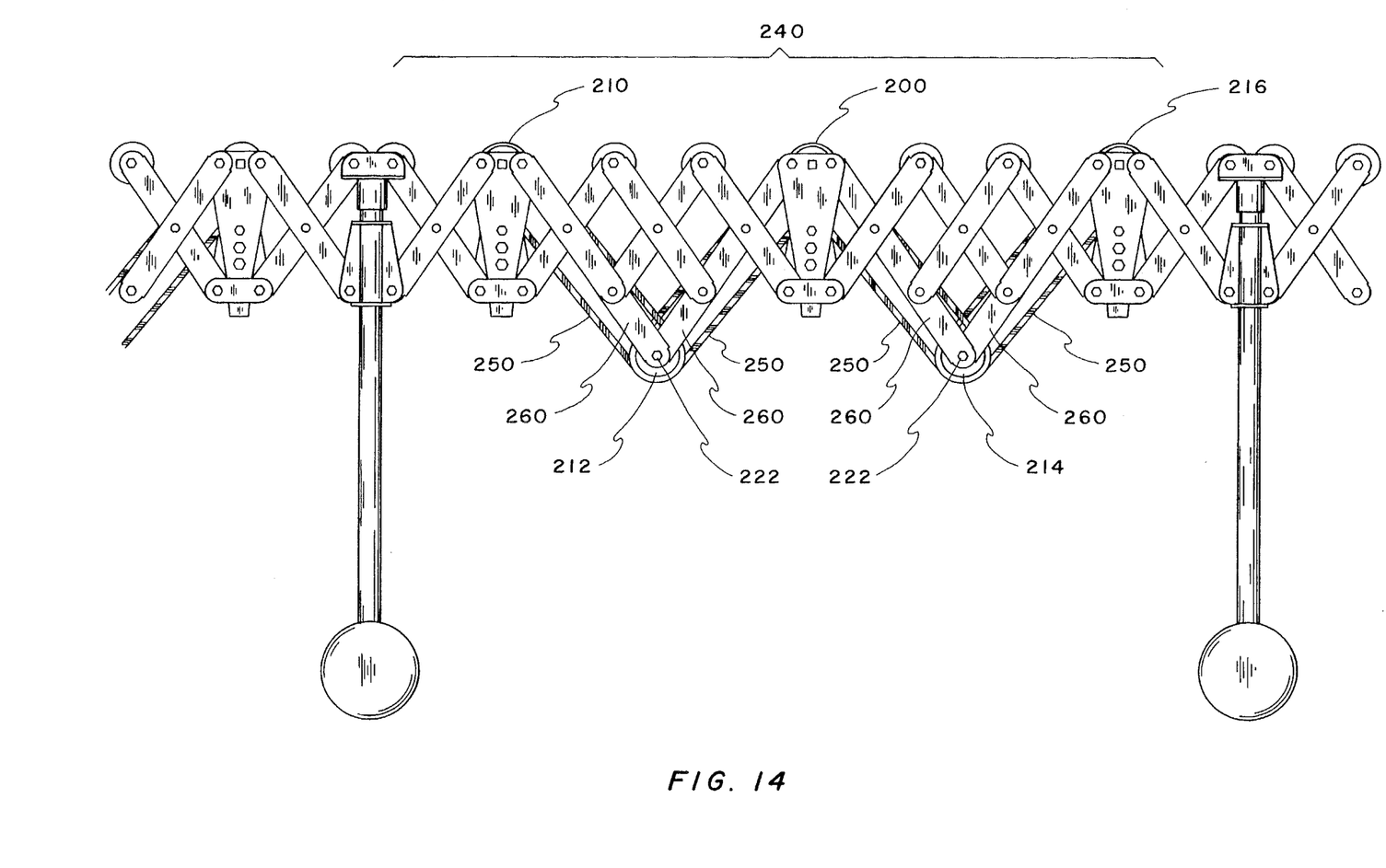
FIG. 14 is an elevation view, partly schematic, of a side link assembly with powered and driven rollers used in a second embodiment of the invention.

A second embodiment of the invention employs individually power rollers in combination with driven rollers. Driven rollers are rollers without their own motor or other independent power source. As shown in FIGS. 12–14, the powered rollers 200 and driven rollers 210 of the second embodiment each have a pair of grooves 220 for receiving a pair of O-rings 250 or other continuous belts. The O-rings 250 drivably connect a powered roller 200 with one or more driven rollers. As shown in FIG. 14, one bed section 240 of this embodiment of the invention includes one powered roller 200 and four driven rollers 210, 212, 214, and 216, all connected to powered roller 200 by O-rings 250. Driven rollers 210 and 216 rotate along the same conveyor surface as powered roller 200, while driven rollers 212, 214 rotate below the conveyor surface. In fact, driven rollers 212, 214 are rotatably connected to the side link assemblies with a pair of full links 260 which form a "V" shape at shaft 222 of driven rollers 212, 214. In this manner, powered roller 200 transmits rotational motion to each of the driven rollers through O-rings 250. This reduces the number of powered rollers needed for the conveyor. In all other respects, the conveyor is assembled as described in connection with the first embodiment. Of course, more than one powered roller may be used in each bed section, if desired.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A powered, flexible conveyor for transporting objects comprising:

at least two spaced parallel flexible link assemblies;

a plurality of spaced rollers interconnecting the spaced parallel link assemblies;

means for mounting an end of each spaced roller onto the flexible link assemblies, said mounting means including an inner power roller link and an outer power roller link, one of said power roller links being vertically moveable relative to said spaced roller;

a motor housed in at least one of said spaced rollers for individually rotating said roller to transport objects along the conveyor; and power supply means connected to said motor.

2. The powered, flexible conveyor of claim 1 further comprising a plurality of rods each having a plurality of freely rotating skate wheels mounted thereon, said rods interconnecting said side link assemblies.

3. The conveyor of claim 1 wherein each link assembly comprises a plurality of links pivotally connected to each other in an X-shaped chain.

4. The conveyor claim 1 wherein said roller housing said motor also has an individually associated gear box means housed within said roller.

5. A powered, flexible conveyor for transporting objects comprising:

a pair of spaced parallel flexible link assemblies, each flexible link assembly comprising a plurality of links pivotally connected to each other in a chain;

a plurality of spaced rollers interconnecting the link assemblies, at least one of said spaced rollers being powered by a motor coupled to said roller to individually rotate said roller;

means for mounting an end of each spaced powered roller onto the flexible link assemblies, said mounting means including an inner power roller link and an outer power roller link, said inner power roller link including means for vertically sliding said inner power roller link relative to said outer power roller link; and a power source for supplying power to the at least one motor.

6. The conveyor of claim 5 wherein said rollers define a conveyor bed, and said outer power roller link includes a base which remains co-planar with said conveyor bed.

7. The conveyor of claim 5 wherein the mounting means further comprises a shaft extending from each end of the spaced rollers, the shaft being rotatably received in apertures formed in said outer power roller links.

8. The conveyor of claim 5 further comprising a terminal block electrically connected to said motor, and means for securing said terminal block to one of said outer power roller links.

9. A powered, flexible conveyor for transporting objects comprising:

a pair of spaced parallel flexible link assemblies, each flexible link assembly comprising a plurality of links pivotally connected to each other in a chain;

a plurality of spaced rollers interconnecting the link assemblies, at least one of said spaced rollers being powered by a motor housed within said roller and coupled to said roller to rotate said roller;

means for mounting an end of each spaced powered roller onto the flexible link assemblies, said mounting means including an inner power roller link vertically moveable relative to said powered roller and an outer power roller link vertically fixed relative to said power roller; and a power source for supplying power to the at least one motor.

10. The conveyor of claim 9 wherein said inner power roller link and outer power roller link are mounted to one of the pair of flexible link assemblies, and wherein said outer power roller link is also mounted to said powered roller.

\* \* \* \* \*